(12) United States Patent
Endo et al.

(10) Patent No.: US 6,628,097 B2
(45) Date of Patent: Sep. 30, 2003

(54) MACHINE TOOL AND CONTROL METHOD THEREFOR

(75) Inventors: Nobuyuki Endo, Shizuoka (JP); Yukihiro Inoue, Shizuoka (JP); Takehisa Kajiyama, Shizuoka (JP)

(73) Assignee: Star Micronics Co., Ltd., Shizuoka (JP)

( * ) Notice: Subject to any disclaimer, the term of this patent is extended or adjusted under 35 U.S.C. 154(b) by 0 days.

(21) Appl. No.: 10/212,043

(22) Filed: Aug. 6, 2002

(65) Prior Publication Data

US 2003/0030400 A1 Feb. 13, 2003

(30) Foreign Application Priority Data

Aug. 9, 2001 (JP) ........................................ 2001-242401

(51) Int. Cl.[7] ........................ G05B 19/18; G05B 19/29; G05B 19/10
(52) U.S. Cl. ........................ 318/569; 318/567; 318/600
(58) Field of Search ................................. 318/569, 600, 318/601, 603–605, 636, 565, 567

(56) References Cited

U.S. PATENT DOCUMENTS

| | | | |
|---|---|---|---|
| 3,701,888 A | * | 10/1972 | McDaniel .................. 318/562 |
| 4,107,654 A | * | 8/1978 | Nishijima ............... 340/825.23 |
| 4,272,818 A | * | 6/1981 | McDaniel ..................... 700/66 |
| 5,084,660 A | * | 1/1992 | Sasaki et al. ................ 318/569 |
| 5,173,648 A | * | 12/1992 | Kawamura et al. .... 318/568.13 |
| 5,184,053 A | * | 2/1993 | Maruo et al. ................ 318/571 |

FOREIGN PATENT DOCUMENTS

| | | |
|---|---|---|
| JP | 03-296109 | 12/1991 |
| JP | 04-051301 | 2/1992 |

* cited by examiner

Primary Examiner—Robert E. Nappi
Assistant Examiner—Patrick L Miller
(74) Attorney, Agent, or Firm—Rosenthal & Osha L.L.P.

(57) ABSTRACT

A machine tool and a control method therefor providing an improved machining accuracy even when a numerical control and electronic cam control coexist. The CPU determines the moving position of the workpiece, the tool, and the drilling tool according to the command from each channel machining sequence storage portion, and outputs the determined position as a command signal in response to the pulse signal generated at the pulse signal generating circuit. The workpiece, the tool, and the drilling tool are thereby electronic cam controlled. The CPU also determines the moving position of the workpiece and the tool according to the command from each channel machining sequence storage portion, and outputs the determined position as a command signal in response to the divided timing signal generated at the divided timing signal generating circuit. The workpiece and the tool are thereby numerically controlled.

4 Claims, 6 Drawing Sheets

FIG. 3 (a)

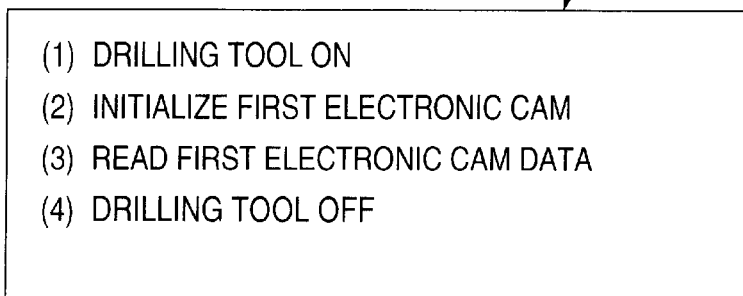

(1) DRILLING TOOL ON
(2) INITIALIZE FIRST ELECTRONIC CAM
(3) READ FIRST ELECTRONIC CAM DATA
(4) DRILLING TOOL OFF

FIG. 3 (b)

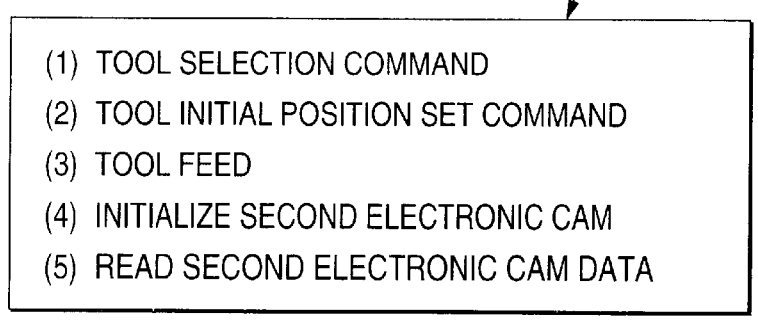

(1) TOOL SELECTION COMMAND
(2) TOOL INITIAL POSITION SET COMMAND
(3) TOOL FEED
(4) INITIALIZE SECOND ELECTRONIC CAM
(5) READ SECOND ELECTRONIC CAM DATA

FIG. 3 (c)

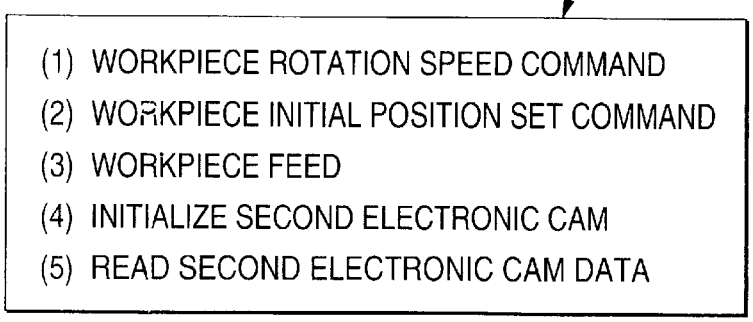

(1) WORKPIECE ROTATION SPEED COMMAND
(2) WORKPIECE INITIAL POSITION SET COMMAND
(3) WORKPIECE FEED
(4) INITIALIZE SECOND ELECTRONIC CAM
(5) READ SECOND ELECTRONIC CAM DATA

MACHINE TOOL AND CONTROL METHOD THEREFOR

BACKGROUND OF THE INVENTION

1. Field of the Invention

The present invention relates to a machine tool for machining a workpiece into a desired shape by a tool by moving at least one of the workpiece and the tool with the workpiece rotated around a predetermined axis, and also relates to a control method for the same.

2. Description of the Related Art

A numerically controlled machine tool is conventionally known. As shown in JP-A-4-51301, the machine reads a machining program block by block and executes the operation as defined by each block.

An electronic-cam-controlled machine tool is also conventionally known as a replacement of a conventional mechanical-cam-controlled machine tool. As shown in JP-A-3-296109, a driving control apparatus of a machine tool comprises a pulse encoder mounted on a rotatable member, storage means for storing an ever-changing rotational position by reading a pulse signal from the pulse encoder, and another storage means for storing a command position data of a moving axis set for every unit rotational position of the rotatable member. Such driving control apparatus generates an ever-changing moving command data for the moving axis according to the stored rotational position data and the stored command position data. It also generates a command speed data for the moving axis in synchronous with the rotational speed of the rotatable member according to the generated moving command data and the stored rotational position data, thereby controlling the position of a tool based on the generated moving command data and the generated command speed data.

The numerical control is based on time while the electronic cam control is based on a rotation of a spindle (workpiece). If the numerical control and the electronic cam control coexist in machining of a workpiece, the machining accuracy is deteriorated because the movement of the workpiece and/or the tool under the numerical control cannot be executed in synchronous with those under the electronic cam control.

SUMMARY OF THE INVENTION

An object of the present invention is to provide a machine tool and a control method therefor where machining accuracy of the workpiece by the tool is improved even when the numerical control and the electronic cam control coexist.

The present invention provides a machine tool for machining a workpiece into a desired shape by a tool by moving at least one of the workpiece and the tool with the workpiece rotated around a predetermined axis, comprising:

reference clock signal generating means for generating a clock signal at a predetermined interval;

workpiece rotation control means for controlling the workpiece to rotate at a desired rotational speed on the basis of the clock signal generated at the reference clock signal generating means;

pulse signal generating means for generating a pulse signal every predetermined rotational angle of the predetermined axis;

first moving position determining means for determining the moving position of at least one of the workpiece and the tool at a predetermined rotational angle position of the workpiece in response to the pulse signal;

first moving control means for controlling the movement, of at least one of the workpiece and the tool in response to the pulse signal so that at least one of the workpiece and the tool may be moved to the moving position determined by the first moving position determining means;

divided timing signal generating means for generating a divided timing signal every predetermined time interval on the basis of the clock signal generated at the reference clock signal generating means;

second moving position determining means for determining the moving position of at least one of the workpiece and the tool for the every predetermined time interval; and, second moving control means for controlling the movement of at least one of the workpiece and the tool in response to the divided timing signal so that at least one of the workpiece and the tool may be moved to the moving position determined by the second moving position determining means The present invention also provides a control method for a machine tool for machining a workpiece into a desired shape by a tool by moving at least one of the workpiece and the tool with the workpiece rotated around a predetermined axis, the machine tool comprising:

reference clock signal generating means for generating a clock signal at a predetermined interval;

pulse signal generating means for generating a pulse signal every predetermined rotational angle of the predetermined axis; and, divided timing signal generating means for generating a divided timing signal every predetermined time interval on the basis of the clock signal generated at the reference clock signal generating means;

the control method comprising:

controlling the workpiece by workpiece rotation control means to rotate at a desired rotational speed on the basis of the clock signal generated at the reference clock signal generating means;

determining the moving position of at least one of the workpiece and the tool at a predetermined rotational angle position of the workpiece in response to the pulse signal by first moving position determining means;

controlling the movement of at least one of the workpiece and the tool in response to the pulse signal by first moving control means so that at least one of the workpiece and the tool may be moved to the moving position determined by the first moving position determining means;

determining the moving position of at least one of the workpiece and the tool for the every predetermined time interval by second moving position determining means; and, controlling the movement of at least one of the workpiece and the tool in response to the divided timing signal by second moving control means so that at least one of the workpiece and the tool may be moved to the moving position determined by the second moving position determining means.

According to the machine tool or the control method of the present invention, the movement of at least one of the workpiece and the tool is executed under electronic cam control in response to a pulse signal from the pulse signal generating means. Particularly, at least one of the workpiece and the tool is moved to a moving position, which is a position determined by the first moving position determining means, by the first moving control means while the workpiece is rotated at a desired rotational speed on the basis of a clock signal from the reference clock signal generating means. Therefore, the movement of at least one of the workpiece and the tool by the first moving control means is controlled in synchronous with a clock signal from the reference clock signal generating means.

According to the machine tool or the control method for the same of the present invention, the movement of at least one of the workpiece and the tool is executed under numerical control in response to a divided timing signal from the divided timing signal generating means. Particularly, at least one of the workpiece and the tool is moved to a moving position, which is a position determined by the second moving position determining means, by the second moving control means while the divided timing signal is generated at a predetermined time interval on the basis of a clock signal from the reference clock signal generating means. Therefore, the movement of at least one of the workpiece and the tool by the second moving control means is also controlled in synchronous with a clock signal from the reference clock signal generating means.

In the present invention having the above described features, the movement of at least one of the workpiece and the tool by the first moving control means is adapted to be in synchronous with the movement of at least one of the workpiece and the tool by the second moving control means, thereby enabling an improvement of machining accuracy even when a numerical control and an electronic cam control coexist.

BRIEF DESCRIPTION OF THE DRAWINGS

FIG. 2 (b) shows the shape of the workpiece after machining.

FIG. 3 (a) is a first channel machining sequence storage portion stored in a RAM of a control unit.

FIG. 3 (b) is a second channel machining sequence storage portion stored in the RAM of the control unit.

FIG. 3 (c) is a third channel machining sequence storage portion stored in the RAM of the control unit.

DETAILED DESCRIPTION OF THE INVENTION

The present invention will be described below in detail with reference to the accompanying drawings. The embodiment shows a screw-thread cutting wherein a workpiece in the shape of a barstock is machined into the shape of a screw.

Figure 1:
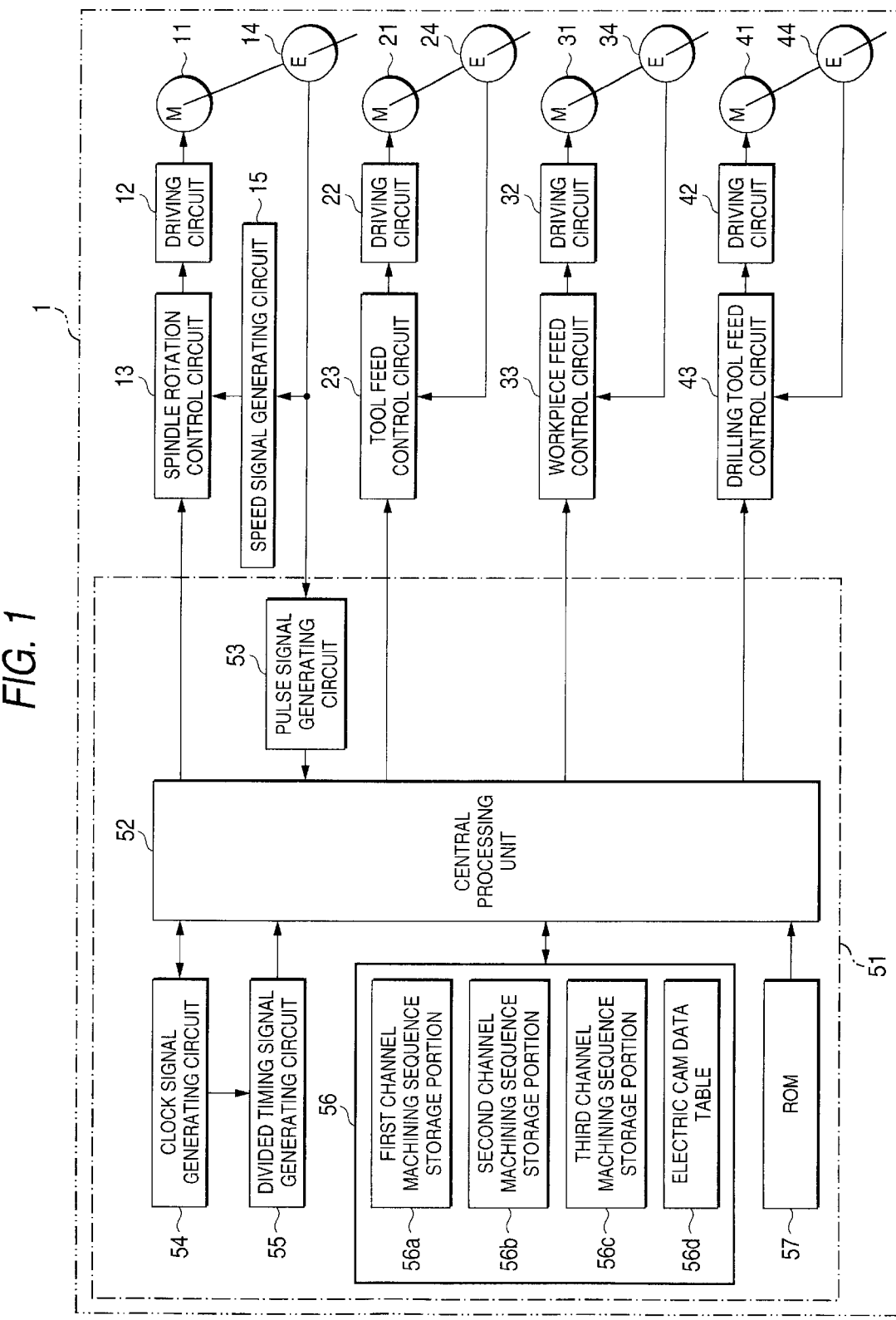
FIG. 1 is a block diagram showing the structure of the machine tool of the present invention.

FIG. 1 is a block diagram showing a structure of a machine tool 1 according to the present invention. The machine tool 1 comprises a spindle rotating motor 11, a tool moving motor 21, a workpiece moving motor 31, a drilling tool moving motor 41, and a control unit 51 for driving the motors 11, 21, 31, and 41.

The spindle rotating motor 11 is connected to the control unit 51 via a driving circuit 12 and a spindle rotation control circuit 13 and adapted to rotate a spindle (not shown) where the workpiece is held. The spindle rotating motor 11 is provided with a pulse encoder 14 for detecting a rotation of the spindle rotating motor 11. The output of the pulse encoder 14 is connected to the control unit 51 and a speed signal generation circuit 15. The pulse encoder 14 generates a rotation detection signal in synchronous with rotation of the spindle rotating motor 11 (spindle) to transmit it to the control unit 51 and the speed signal generation circuit 15. The rotation center axis of the spindle rotating motor 11 corresponds to the predetermined axis as defined in the claims.

The speed signal generation circuit 15 converts the rotation detection signal into a spindle rotational speed signal representing a rotational speed of the spindle rotating motor 11 (spindle). The output of the speed signal generation circuit 15 is connected to the spindle rotation control circuit 13 to which the converted signal is inputted.

The spindle rotation control circuit 13 (workpiece rotation control means) controls the workpiece (spindle) to rotate at a desired rotational speed on the basis of a clock signal generated by a clock signal generating circuit 54 (reference clock signal generating means) described later. Particularly, the spindle rotation control circuit 13 compares a spindle rotational speed command signal from the control unit 51 with the spindle rotational speed signal from the speed signal generating circuit 15, thereby generating a control signal according to the differential on the basis of the clock signal. The generated control signal is outputted to the driving circuit 12.

The driving circuit 12, in response to the control signal from the spindle rotation control circuit 13, controls power supply to the spindle rotating motor 11 to let the rotational speed thereof be a spindle rotational speed command value (described later). The driving circuit 12, the spindle rotation control circuit 13, and the speed signal generating circuit 15 constitute a feedback control system for the spindle rotating motor 11 (spindle) with respect to a rotational speed thereof.

The tool moving motor 21 moves a machining tool (cutting tool, etc.) in a direction (X-axis direction), for example, perpendicular to the rotational center axis of the spindle rotating motor 11. The tool moving motor 21 is connected to the control unit 51 via a driving circuit 22 and a tool feed control circuit 23. The tool moving motor 21 is provided with a pulse encoder 24 for detecting a rotation of the tool moving motor 21. The output of the pulse encoder 24 is connected to the tool feed control circuit 23. The pulse encoder 24 generates a rotational position signal every predetermined rotational angle of the tool moving motor 21 to transmit it to the tool feed control circuit 23.

The tool feed control circuit 23 recognizes an actual position of the tool in response to the rotational position signal, and compares the actual position of the tool with a tool position command signal from the control unit 51 (described later), thereby generating a tool driving signal as a result of the comparison. The tool driving signal is outputted to the driving circuit 22 to control power supply to the tool moving motor 21. The driving circuit 22 and the tool feed control circuit 23 constitute a feedback system for the tool with respect to the moving position thereof.

The workpiece moving motor 31 moves the workpiece in a direction (Z-axis direction), for example, parallel to the rotational center axis of the spindle rotating motor 11. The workpiece moving motor 31 is connected to the control unit 51 via a driving circuit 32 and a workpiece feed control circuit 33. The workpiece moving motor 31 is provided with a pulse encoder 34 for detecting a rotation of the workpiece moving motor 31. The output of the pulse encoder 34 is connected to the workpiece feed control circuit 33. The pulse encoder 34 generates a rotational position signal every predetermined rotational angle of the workpiece moving motor 31 to transmit it to the workpiece feed control circuit 33.

The workpiece feed control circuit 33 recognizes an actual position of the workpiece in response to the rotational position signal, and compares the actual position of the workpiece with a workpiece position command signal from the control unit 51 (described later), thereby generating a workpiece driving signal as a result of the comparison. The workpiece driving signal is outputted to the driving circuit 32 to control power supply to the workpiece moving motor 31. The driving circuit 32 and the workpiece feed control circuit 33 constitute a feedback system for the workpiece with respect to the moving position thereof.

The drilling tool moving motor 41 moves a drilling tool (drill, tap, etc.) in a direction (Z-axis direction), for example, parallel to the rotational center axis of the spindle rotating motor 11. The drilling tool moving motor 41 is connected to the control unit 51 via a driving circuit 42 and a drilling tool feed control circuit 43. The drilling tool moving motor 41 is provided with a pulse encoder 44 for detecting a rotation of the drilling tool moving motor 41. The output of the pulse encoder 44 is connected to the drilling tool feed control circuit 43. The pulse encoder 44 generates a rotational position signal every predetermined rotational angle of the drilling tool moving motor 41 to transmit it to the drilling tool feed control circuit 43. Rotation of the drilling tool is turned ON and OFF by an inverter motor (not shown).

The drilling tool feed control circuit 43 recognizes an actual position of the drilling tool in response to the rotational position signal, and compares the actual position of the drilling tool with a drilling tool position command signal from the control unit 51 (described later), thereby generating a drilling tool driving signal as a result of the comparison. The drilling tool driving signal is outputted to the driving circuit 42 to control power supply to the drilling tool moving motor 41. The driving circuit 42 and the drilling tool feed control circuit 43 constitute a feedback system for the drilling tool with respect to the moving position thereof.

Figure 2:
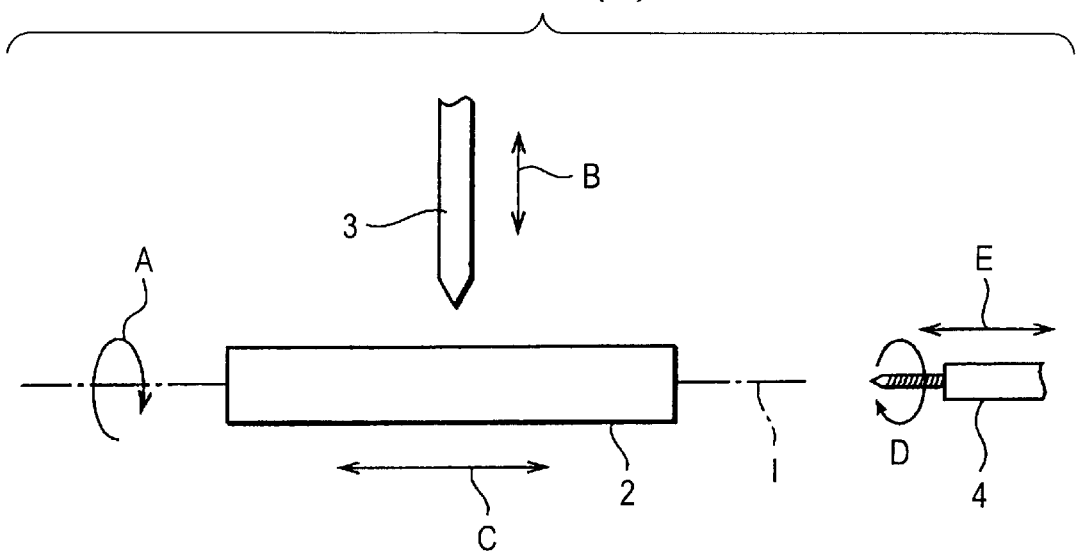
FIG. 2 (a) is an example of a machining operation in the machine tool showing the shape of a workpiece before machining.
Figure 2:
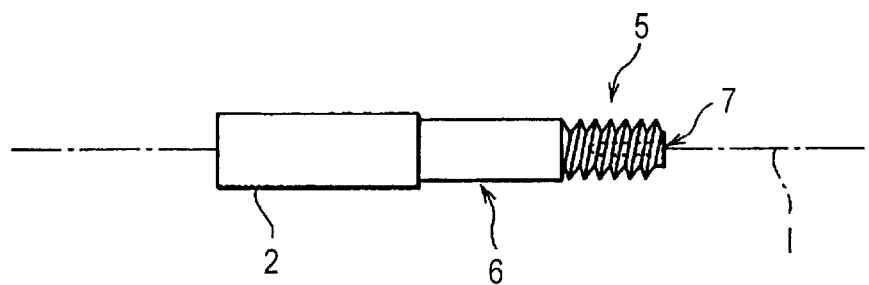

FIG. 2 (*a*) shows an example of a machining operation in the machine tool 1. The workpiece 2 in the shape of a barstock is rotated by the spindle rotating motor 11 around the rotation center axis 1 thereof (in the direction of arrow A) while it is moved by the workpiece moving motor 31 in a direction parallel to the rotation center axis 1 of the spindle rotating motor 11 (in the direction of arrow C). The tool 3 is moved by the tool moving motor 21 in a direction perpendicular to the rotation center axis 1 of the spindle rotating motor 11 (in the direction of arrow B) to machine the workpiece 2 into a desired shape. The drilling tool 4 is rotated in a counter direction (in the direction of arrow D) to the rotating direction of the workpiece 2 while it is moved by the drilling tool moving motor 41 in a direction parallel to the rotation center axis 1 of the spindle rotating motor 11 (in the direction of arrow E) to drill the workpiece 2. The workpiece 2 is machined into the shape as shown in FIG. 2 (*b*), comprising a screw portion 5 (of external diameter of 6 mm, for example), a smaller diameter portion 6 (of external diameter of 6 mm, for example), and a hole 7 (of inner diameter of 2 mm, for example). In FIG. 2 (*a*), the arrow B direction corresponds to the aforementioned X-axis direction while the arrows C and E correspond to the aforementioned Z-axis direction respectively.

The control unit 51 comprises, as shown in FIG. 1, a central processing unit (CPU) 52, a pulse signal generating circuit 53, a clock signal generating circuit 54, a divided timing signal generating circuit 55, a random access memory (RAM) 56, and a read only memory (ROM) 57.

The CPU 52 controls an entire signal processing of the control unit 51, comprising first and second moving position determining means and first and second moving control means. The CPU 52 performs a well-known multi-processing operation where a plurality of jobs (programs) are changed over at short intervals to enable an apparent simultaneous processing of a plurality of programs. Such multi-processing operation includes a time-divided operation or a task operation where jobs are executed in order of priority.

The pulse signal generating circuit 53 is connected to the pulse encoder 14 for receiving the rotation detection signal therefrom via an interface, etc., and thereby generating a pulse signal every predetermined rotational angle. The pulse signal generating circuit 53 is also connected to the CPU 52 for transmission of the pulse signals thereto. In this embodiment, the pulse signal generating circuit 53 outputs 4,096 pulse signals at regular intervals in synchronous with the spindle rotating motor 11 whenever the spindle rotating motor 11 makes a single rotation.

The clock signal generating circuit 54 is adapted to generate a clock signal at a predetermined, for example 0.25 millisecond, interval in response to a predetermined command signal from the CPU 52. The generated clock signal is outputted to the divided timing signal generating circuit 55. The divided timing signal generating circuit 55 counts the number of clock signals from the clock signal generating circuit 54, then generating a divided timing signal, for example, every elapse of one (1) millisecond, and transmitting it to the CPU 52. Thus, the divided timing signal generating circuit 55 outputs a divided timing signal as an interrupt timing signal (described later) to the CPU 52 at one (1) millisecond interval. The interval of the clock signal or the divided timing signal is not limited to the above example. It may be any appropriate value according to the capability or performance of the CPU 52, the pulse encoders 24, 34, and 44, and the motors 11, 21, 31, and 41.

The RAM 56 is adapted to temporarily and readably store the results of various calculations by the CPU 52, comprising a first channel machining sequence storage portion 56*a*, a second channel machining sequence storage portion 56*b*, and a third channel machining sequence storage portion 56*c*.

The first channel machining sequence storage portion 56*a* stores, as shown in FIG. 3 (*a*), a drilling operation sequence by the drilling tool 4. The sequence comprises the events of "drilling tool ON", "initialize first electronic cam", "read first electronic cam data", and "drilling tool OFF" in the particular order (1) to (4) in FIG. 3 (*a*). The moving position of the drilling tool 4 is controlled according to the sequence stored in the first channel machining sequence storage portion 56*a*.

The "drilling tool ON" and the "drilling tool OFF" are respectively stored in a bit format by converting the corresponding G code into a binary data (0 and 1) in accordance with an ISO format, EIA format, etc. These events are executed under numerical control.

In the "initialize first electronic cam", the drilling tool 4 is set to the initial position. In the "read first electronic cam data", the CPU 52 reads positional data (E) of the drilling tool 4, which is set every accumulated number of rotations of the spindle rotating motor 11 (spindle), out of an electronic cam data table 56d (described later). The moving position of the drilling tool 4 is thus determined every predetermined rotational angle of the spindle rotating motor 11, that is every 360/4096 degrees. The CPU 52 then outputs positional data, representing the moving position of the drilling tool 4 every 360/4096 degrees of the spindle rotating motor 11, to the drilling tool feed control circuit 43, as the drilling tool position command signal. The CPU 52 outputs the drilling tool position command signal in response to the pulse signal from the pulse signal generating circuit 53. Particularly, in response to the pulse signal, the drilling tool position command signal is outputted in synchronous with rotation of the spindle rotating motor 11 every time the spindle rotating motor 11 rotates 360/4096 degrees. The events of "initialize first electronic cam" and "read first electronic cam data" are executed under electronic cam control.

The second channel machining sequence storage portion 56b stores, as shown in FIG. 3 (b), a screw-thread cutting sequence by the tool 3. The sequence comprises the events of "tool selection command", "tool initial position set command", "tool feed", "initialize second electronic cam", and "read second electronic cam data" in the particular order (1) to (5) in FIG. 3 (b). The moving position of the tool 3 is controlled according to the sequence stored in the second channel machining sequence storage portion 56b.

The events of "tool selection command", "tool initial position set command", and "tool feed" are respectively stored in a bit format by converting the corresponding G code into a binary data (0 and 1) in accordance with an ISO format, EIA format, etc. These events are executed under numerical control.

With regard to the "tool feed", the CPU 52 determines a moving position of the tool 3 every one (1) millisecond from the start of machining and outputs the determined position to the tool feed control circuit 23 as a tool position command signal. The CPU 52 outputs the tool position command signal in response to the divided timing signal from the divided timing signal generating circuit 55. Particularly, the tool position command signal is outputted every elapse of one (1) millisecond from the start of the machining, which is not in synchronous with the rotation of the spindle rotating motor 11, in response to the divided timing signal from the divided timing signal generating circuit 55.

In the "initialize second electronic cam", the tool 3 is set to the initial position. In the "read second electronic cam data", the CPU 52 reads positional data (X) of the tool 3, which is set every accumulated number of rotations of the spindle rotating motor 11 (spindle), out of the electronic cam data table 56d (described later). The moving position of the tool 3 is thus determined every predetermined rotational angle of the spindle rotating motor 11, that is, every 360/4096 degrees. The CPU 52 then outputs positional data, representing the moving position of the tool 3 every 360/4096 degrees of the spindle rotating motor 11, to the tool feed control circuit 23, as the tool position command signal. The CPU 52 outputs the tool position command signal in response to a pulse signal from the pulse signal generating circuit 53. Particularly, in response to the pulse signal, the tool position command signal is outputted in synchronous with rotation of the spindle rotating motor 11 every time the spindle rotating motor 11 rotates 360/4096 degrees. The events of "initialize second electronic cam" and "read second electronic cam data" are executed under electronic cam control.

The third channel machining sequence storage portion 56c stores, as shown in FIG. 3 (c), an operating sequence of the workpiece in the screw-thread cutting operation. The sequence comprises the events of "workpiece rotational speed command", "workpiece initial position set command", "workpiece feed", "initialize second electronic cam", and "read second electronic cam data" in the particular order (1) to (5) in FIG. 3 (c). The moving position of the workpiece 2 is controlled according to the sequence stored in the third channel machining sequence storage portion 56c.

The events of "workpiece rotational speed command", "workpiece initial position set command", and "workpiece feed" are respectively stored in a bit format by converting the corresponding G code into a binary data (0 and 1) in accordance with an ISO format, EIA format, etc. These events are executed under numerical control.

With regard to the "workpiece feed", the CPU 52 determines a moving position of the workpiece 2 every one (1) millisecond from the start of machining and outputs the determined position to the workpiece feed control circuit 33 as the workpiece position command signal to move the workpiece 2 to a predetermined position. The CPU 52 outputs the workpiece position command signal in response to the divided timing signal from the divided timing signal generating circuit 55. Particularly, the workpiece position command signal is outputted every elapse of one (1) millisecond from the start of the machining, which is not in synchronous with the rotation of the spindle rotating motor 11, in response to the divided timing signal from the divided timing signal generating circuit 55.

In the "initialize second electronic cam", the workpiece 2 is set to the initial position. In the "read second electronic cam data", the CPU 52 reads positional data (Z) of the workpiece 2, which is set every accumulated number of rotations of the spindle rotating motor 11 (spindle), out of the electronic cam data table 56d (described later). The moving position of the workpiece 2 is thus determined every predetermined rotational angle of the spindle rotating motor 11, that is, every 360/4096 degrees. The CPU 52 then outputs positional data, representing the moving position of the workpiece 2 every 360/4096 degrees of the spindle rotating motor 11, to the workpiece movement control circuit 23, as the workpiece position command signal. The CPU 52 outputs the workpiece position command signal in response to a pulse signal from the pulse signal generating circuit 53. Particularly, in response to the pulse signal, the workpiece position command signal is outputted in synchronous with rotation of the spindle rotating motor 11 every time the spindle rotating motor 11 rotates 360/4096 degrees. The events of "initialize second electronic cam" and "read second electronic cam data" are executed under electronic cam control.

Figure 4:
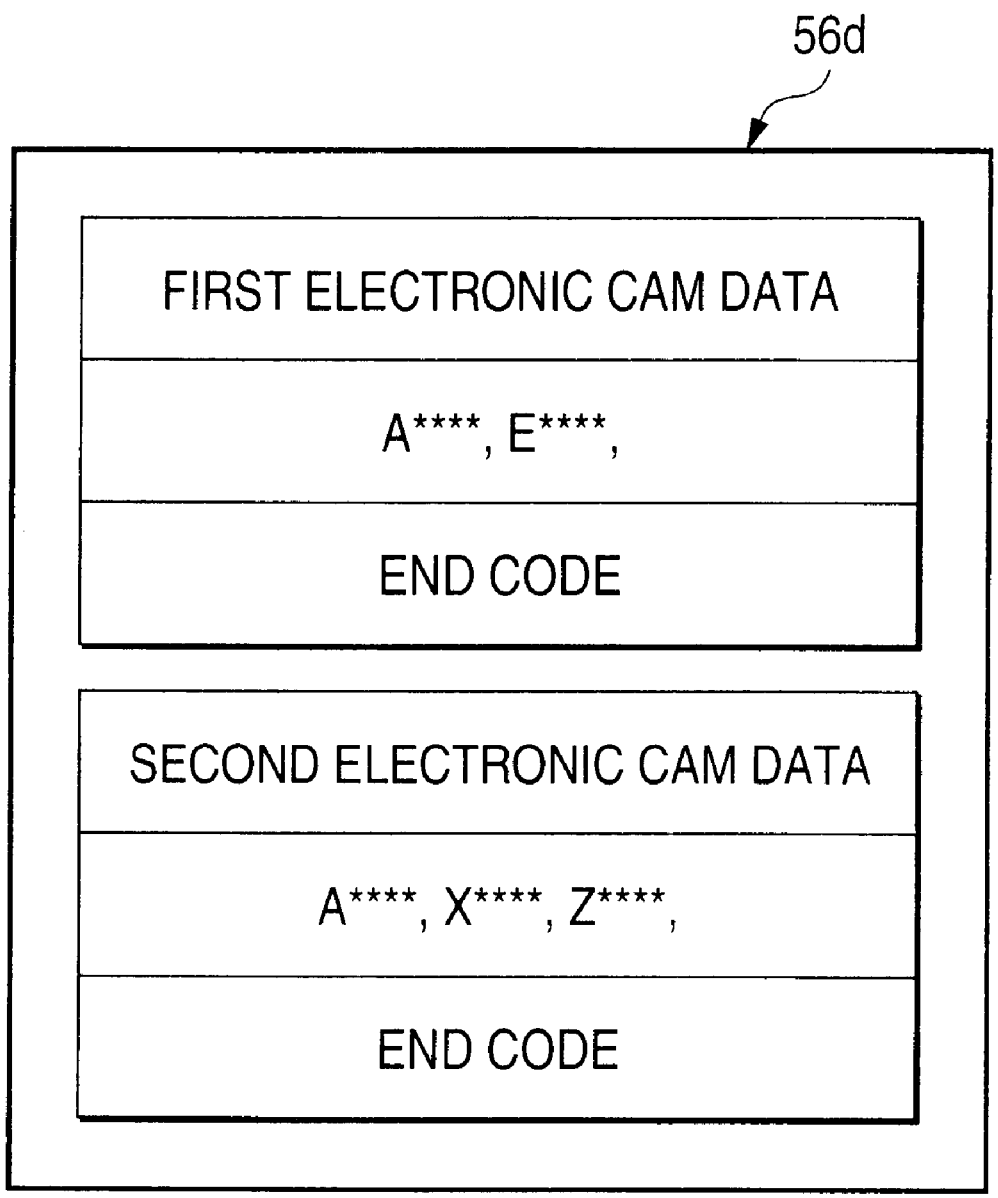
FIG. 4 is an electronic cam data table stored in the RAM of the control unit.

The electronic cam data table 56d in the RAM 56 stores, as shown in FIG. 4, a first electronic cam data comprising the positional data (E) of the drilling tool 4 which is set every accumulated number of rotations (A) of the spindle rotating motor 11, and a second electronic cam data comprising the positional data (Z) of the workpiece 2 and the positional data (X) of the tool 3 which are respectively set every predetermined accumulated number of rotations (A) of the spindle rotating motor 11. The first electronic cam data and the second electronic cam data comprise an end code respectively representing the end of machining. The predetermined accumulated number of rotations (A) may correspond to each of the predetermined rotational angles, though increasing the storage capacity.

The ROM 57 stores various processing programs including a calculation program for determining the moving position of the workpiece 2 or the tool 3 every predetermined time interval, for example every one (1) millisecond, in a screw-thread cutting operation, and a calculation program for determining the moving position of the workpiece 2, the tool 3 or the drilling tool 4 every predetermined rotational angle of the spindle rotating motor 11, for example every 360/4096 degrees, in a drilling or cutting operation.

The CPU 52 counts the number of pulse signals generated by the pulse signal generating circuit 53 according to the program stored in the ROM 57, and, from the counted results, calculates the accumulated number of rotations of the spindle rotating motor 11.

The movement control by the CPU 52 (the control unit 51) of the tool 3, the workpiece 2, and the drilling tool 4 is described below.

The CPU 52 multiprocesses the "drilling tool ON" in the first channel machining sequence storage portion 56a, the "tool selection command" in the second channel machining sequence storage portion 56b, and the "workpiece rotational speed command" in the third channel machining sequence storage portion 56c. Particularly, the CPU 52 reads "drilling tool ON" and outputs a command signal to rotate the drilling tool 4. The CPU 52 reads "tool selection command" and outputs a command signal to select the tool 3. The CPU reads "workpiece rotational speed command" and outputs the spindle rotational speed command signal to the spindle rotation control circuit 13 to rotate the workpiece (spindle) at a desired rotational speed. This multiprocessing thus enables the drilling tool 4 to be rotated, the tool 3 to be selected, and the workpiece 2 to be rotated at the desired rotational speed. Though the CPU 52 performs a simultaneous control over the tool 3, the workpiece 2, and the drilling tool 4 according to the corresponding ISO code, the jobs are so easy that there would be only a small burden on the CPU 52.

Next, the CPU 52 multiprocesses the "initialize first electronic cam" in the first channel machining sequence storage portion 56a, the "tool initial position set command" in the second channel machining sequence storage portion 56b, and the "workpiece initial position set command" in the third channel machining sequence storage portion 56c. Particularly, the CPU 52 reads "initialize first electronic cam" and makes a preparation for reading positional data of the drilling tool 4 stored in the electronic cam data table. The CPU 52 reads "tool initial position set command" and outputs a command signal to the tool feed control circuit 23 to move the tool 3 to the initial position. The CPU reads "workpiece initial position set command" and outputs a command signal to the workpiece feed control circuit 33 to move the workpiece to the initial position. This multiprocessing thus enables the tool 3 and the workpiece 2 to be moved to the initial positions respectively while making a preparation for reading positional data from the electronic cam data table.

Next, the CPU 52 multiprocesses the "read first electronic cam data" in the first channel machining sequence storage portion 56a, the "tool feed" in the second channel machining sequence storage portion 56b, and the "workpiece feed" in the third channel machining sequence storage portion 56c. Particularly, the CPU 52 reads "read first electronic cam data", determines the moving position of the drilling tool 4 every 360/4096 degrees of the spindle rotating motor 11, and outputs the determined position as the drilling tool position command signal to the drilling tool feed control circuit 43 in response to the pulse signal from the pulse signal generating circuit 53. The CPU 52 reads "tool feed", determines the moving position of the tool 3 every one (1) millisecond from the start of machining, and outputs the determined moving position as the tool position command signal to the tool feed control circuit 23 in response to the divided timing signal from the divided timing signal generating circuit 55. The CPU 52 reads "workpiece feed", determines the moving position of the workpiece 2 every one (1) millisecond from the start of machining, and outputs the determined moving position as the workpiece position command signal to the workpiece feed control circuit 33 in response to the divided timing signal from the divided timing signal generating circuit 55. This multiprocessing thus enables the workpiece 2 to be machined into the shape having the hole 7 and the screw portion 5 as shown in FIG. 2 (b).

The movements of the workpiece 2 and the tool 3 are numerically controlled while the movement of the drilling tool 4 is electronic-cam-controlled. The numerical control and the electronic cam control are performed in parallel. The electronic cam control is designed to bring the drilling tool 4 to the target position when the workpiece 2 comes to a predetermined rotational angle position. This is different from the numerical control where a command is executed one by one on the time basis. The electronic cam control handles less amount of data, therefore reducing a burden on the CPU 52. Since the workpiece 2 and the tool 3 are numerically controlled, their relative movements are synchronous with higher accuracy.

Next, the CPU 52 multiprocesses the "drilling tool OFF" in the first channel machining sequence storage portion 56a, the "initialize second electronic cam" in the second channel machining sequence storage portion 56b, and the "initialize second electronic cam" in the third channel machining sequence storage portion 56c. Particularly, the CPU 52 reads "drilling tool OFF" and outputs a command signal to stop the rotation of the drilling tool 4. The CPU 52 reads "initialize second electronic cam" and makes a preparation for reading the positional data of the tool 3 and the workpiece 2 stored in the electronic cam data table.

Next, the CPU 52 multiprocesses the "read second electronic cam data" in the second channel machining sequence storage portion 56b and the "read second electronic cam data" in the third channel machining sequence storage portion 56c. Particularly, the CPU 52 reads "read second electronic cam data", determines the moving positions of the tool 3 and the workpiece 2 every 360/4096 degrees of the spindle rotating motor 11, and outputs the determined positions as the tool position command signal and the workpiece position command signal respectively to the tool feed control circuit 23 and the workpiece feed control circuit 33 in response to the pulse signal from the pulse signal generating circuit 53. The tool 3 is positioned with respect to the X-axis direction and the workpiece is advanced in the Z-axis direction. The workpiece 2 is thereby rough-cut into the shape having the smaller diameter portion 6 as shown in FIG. 2 (b). Since the rough-cutting requires less machining accuracy, a higher machining speed is available by using electronic cam control which imposes less burden on the CPU 52. When the workpiece 2 is rough-cut to form the smaller diameter portion 6, the rotational speed of the workpiece 2 (spindle) may be set higher than the rotational speed in screw-thread cutting.

As described above, the moving positions of the workpiece 2, the tool 3 and the drilling tool 4 are respectively determined by the CPU 52 as a result of "read first electronic cam data" in the first channel machining sequence storage portion 56a, "read second electronic cam data" in the second channel machining sequence storage portion 56b, and "read second electronic cam data" in the third channel machining sequence storage portion 56c. The CPU 52 then outputs a command signal in response to a pulse signal from the pulse signal generating circuit 53 to control (electronic-cam-control) the movements of the workpiece 2, the tool 3 and the drilling tool 4 respectively to bring them to the respective determined positions. Since the workpiece 2 (spindle) is controlled to rotate at a desired rotational speed on the basis of a clock signal from the clock signal generating circuit 54, the movements of the workpiece 2, the tool 3 and the drilling tool 4 are controlled in synchronous with the clock signal from the clock signal generating circuit 54.

The moving positions of the workpiece 2 and the tool 3 are determined by the CPU 52 as a result of "tool feed" in the second channel machining sequence storage portion 56b, and "workpiece feed" in the third channel machining sequence storage portion 56c. The CPU 52 then outputs a command signal in response to the divided timing signal from the divided timing signal generating circuit 55 to control (numerically control) the movements of the workpiece 2 and the tool 3 to bring them to the respective determined positions. Since the divided timing signal is generated at predetermined time intervals on the basis of a clock signal from the clock signal generating circuit 54, the movements of the workpiece 2 and the tool 3 are also controlled in synchronous with the clock signal from the clock signal generating circuit 54.

As above described, the movements according to the determined moving positions as a result of "read first electronic cam data" and "read second electronic cam data" and the movements according to the determined moving positions as a result of "tool feed" and "workpiece feed" are both executed in synchronous with the clock signal generated at the clock signal generating circuit 54. Therefore, the machining accuracy of the workpiece 2 by the tool 3 and the driving tool 4 is improved even though the numerical control and the electronic cam control coexist in a machining of the workpiece 2.

Figure 5:
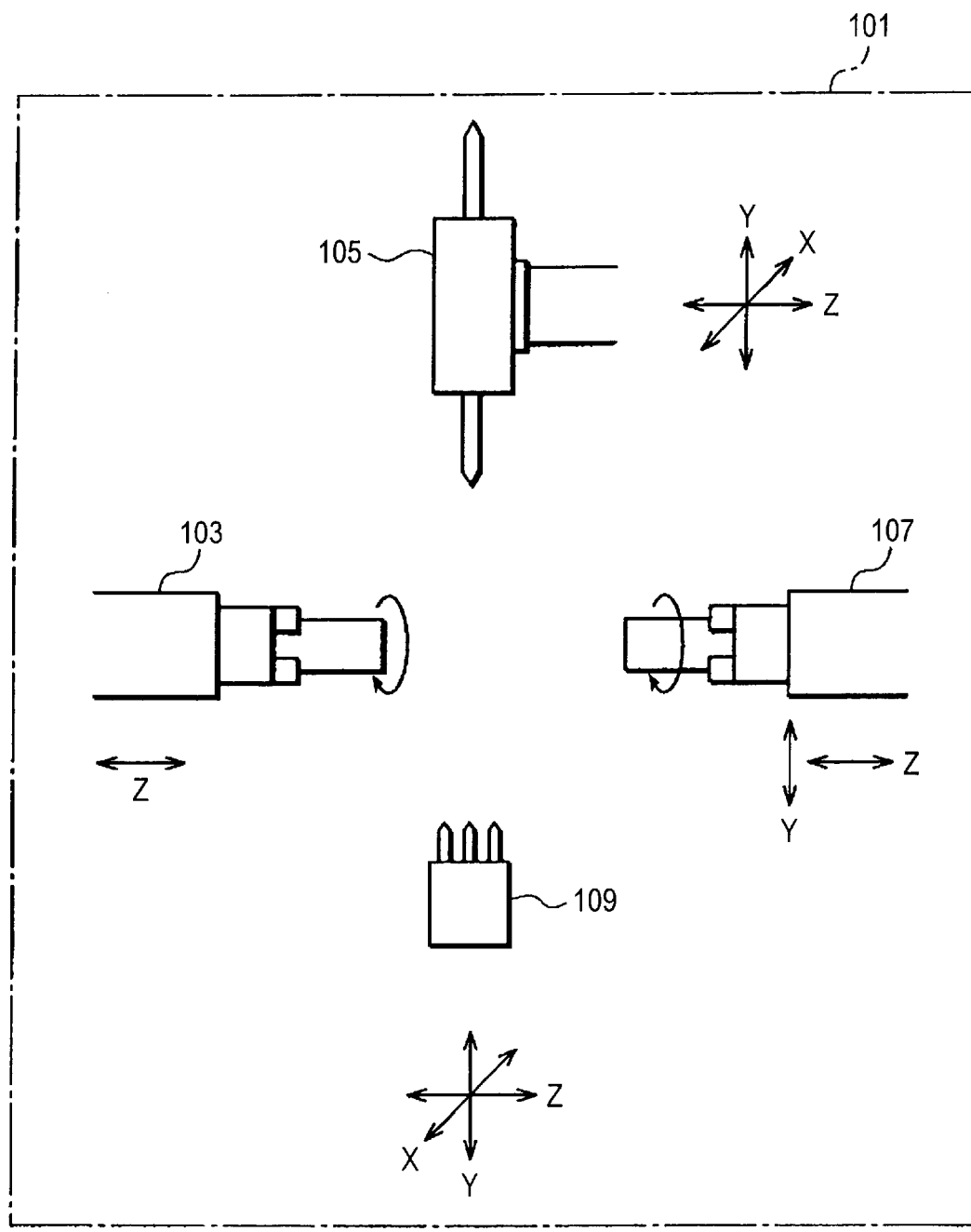
FIG. 5 is a diagram showing a structure of the machine tool of the embodiment.
Figure 6:
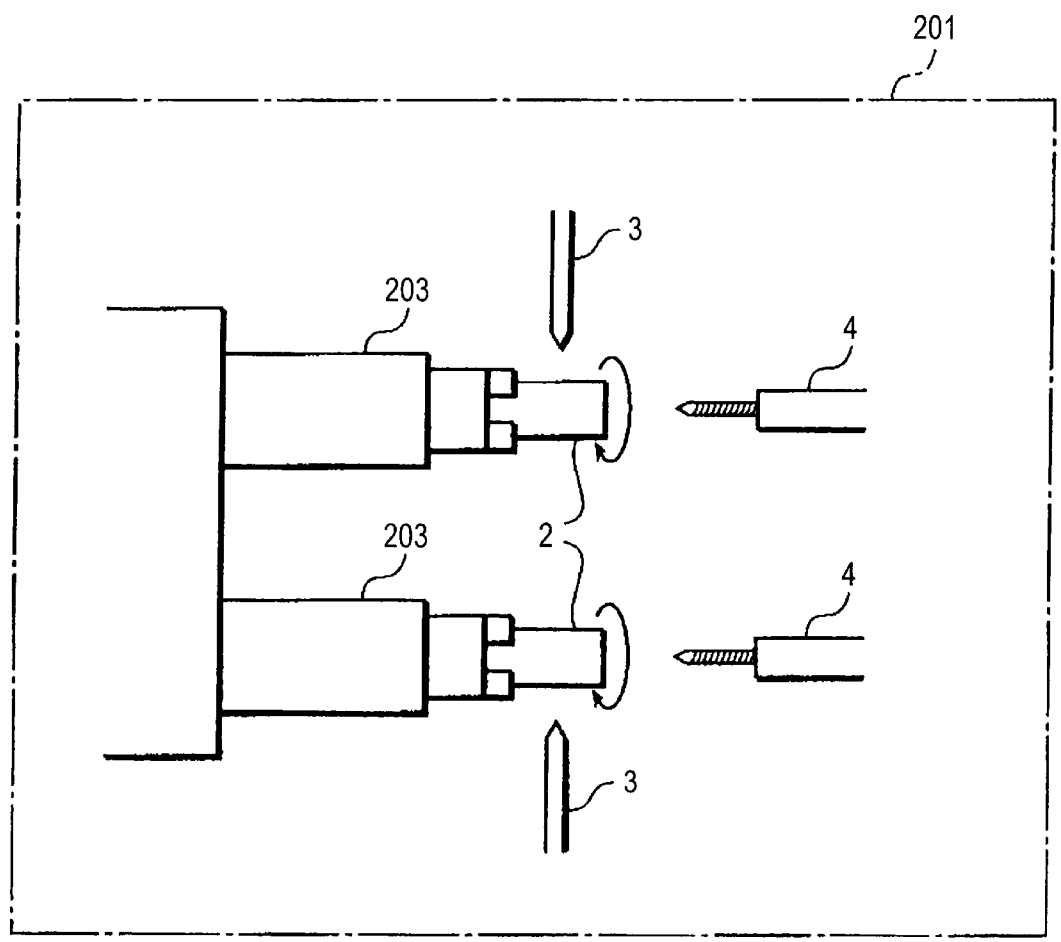
FIG. 6 is a diagram showing a structure of the machine tool of the embodiment.

The present invention is not limited to the above described embodiment. It is applicable to machine tools 101 and 201 shown in FIGS. 5 and 6. The machine tool 101 performs numerically controlled machining by a first spindle 103 and a first turret 105 while performs electronic cam controlled machining by a second spindle 107 and a tool post 109. Particularly, the workpiece 2 held by the first spindle 103 is machined by the first turret 105 under numerical control while it is machined by the tool post 109 under electronic cam control. The machine tool 201 comprises a plurality of spindles 203. The workpiece 2 held by each of the spindles 203 is machined by the tool 3 and the drilling tool 4 under the above described numerical control and electronic cam control. The type or the number of the tools is not limited to this embodiment. The present invention is applicable to various type of machining such as screw-thread cutting, drilling, rough cutting, etc.

Though in this embodiment the moving position of the workpiece 2, the tool 3, or the drilling tool 4 is determined every predetermined rotational angle, it may be totally determined before the start of machining to be stored as positional data. Alternatively, if the CPU 52 is of high performance, it may be determined in response to every pulse signal or divided timing signal to be outputted as a position command signal.

Though the control unit 51 comprises the clock signal generating circuit 54 and the divided timing signal generating circuit 55 in this embodiment, they may be in the form of programs to be stored in the ROM 57 for execution by the CPU 52. Some of the functions of the CPU 52 may be replaced by a hardware circuit.

In this embodiment, the workpiece 2, the tool 3, and the drilling tool 4 are movable and the positions thereof are controlled. The present invention is not limited to this embodiment. Only the workpiece 2 may be movable and the moving position thereof may be controlled. Only the tool 3 may be movable and the moving position thereof may be controlled. Only the drilling tool 4 may be movable and the moving position thereof may be controlled. Only the workpiece 2 and the tool 3 may be movable and the moving position thereof may be controlled. Only the tool 3 and the drilling tool 4 may be movable and the moving position thereof may be controlled. Only the workpiece 2 and the drilling tool 4 may be movable and the moving position thereof may be controlled.

As above described, the present invention provides a machine tool and a control method therefor where machining accuracy of the workpiece by the tool is improved even when the workpiece is machined under numerical control and electronic cam control.

What is claimed is:

1. A machine tool for machining a workpiece into a desired shape by a tool by moving at least one of the workpiece and the tool with the workpiece held by a spindle and rotated around a predetermined axis, the machine tool enabling a synchronous control of at least a first channel machining sequence and a second channel machining sequence of which control method is different from that of the first channel machining sequence at least at a certain point of time, the machine tool comprising:

reference clock signal generating means for generating a clock signal at a predetermined interval;

tool moving means for moving the tool to a predetermined direction;

workpiece moving means for moving the workpiece to a predetermined direction;

spindle rotation control means for controlling the spindle to rotate at a desired rotational speed on the basis of the clock signal generated at the reference clock signal generating means;

pulse signal generating means for generating a pulse signal every predetermined rotational angle of the spindle;

first moving position determining means for determining the moving position of at least one of the workpiece moving means and the tool moving means at a predetermined rotational angle position of the workpiece in response to the pulse signal in the first channel machining sequence;

first moving control means for controlling the movement of at least one of the workpiece and the tool in response to the pulse signal so that at least one of the workpiece and the tool may be moved to the moving position determined by the first moving position determining means;

divided timing signal generating means for generating a divided timing signal every predetermined time interval on the basis of the clock signal generated at the reference clock signal generating means;

second moving position determining means for determining the moving position of at least one of the workpiece moving means and the tool moving means for the every predetermined time interval in the second channel machining sequence; and, second moving control means for controlling the movement of at least one of the workpiece and the tool in response to the divided timing signal so that at least one of the workpiece and the tool may be moved to the moving position determined by the second moving position determining means.

2. A control method for a machine tool for machining a workpiece into a desired shape by a tool by moving at least one of the workpiece and the tool with the workpiece held by a spindle and rotated around a predetermined axis, the machine tool enabling a synchronous control of at least a first channel machining sequence and a second channel machining sequence of which control method is different from that of the first channel machining sequence at least at a certain point of time, the machine tool comprising:

reference clock signal generating means for generating a clock signal at a predetermined interval;

tool moving means for moving the tool to a predetermined direction;

workpiece moving means for moving the workpiece to a predetermined direction;

pulse signal generating means for generating a pulse signal every predetermined rotational angle of the spindle; and, divided timing signal generating means for generating a divided timing signal every predetermined time interval on the basis of the clock signal generated at the reference clock signal generating means;

the control method comprising:

controlling the spindle by spindle rotation control means to rotate at a desired rotational speed on the basis of the clock signal generated at the reference clock signal generating means;

determining the moving position of at least one of the workpiece moving means and the tool moving means at a predetermined rotational angle position of the workpiece in response to the pulse signal in the first channel machining sequence by first moving position determining means;

controlling the movement of at least one of the workpiece and the tool in response to the pulse signal by first moving control means so that at least one of the workpiece and the tool may be moved to the moving position determined by the first moving position determining means;

determining the moving position of at least one of the workpiece moving means and the tool moving means for the every predetermined time interval in the second channel machining sequence by second moving position determining means; and, controlling the movement of at least one of the workpiece and the tool in response to the divided timing signal by second moving control means so that at least one of the workpiece and the tool may be moved to the moving position determined by the second moving position determining means.

3. The machine tool as claimed in claim 1, wherein the pulse signal generating means comprises:

a pulse encoder for detecting a rotation of the spindle; and a pulse signal generating circuit for receiving a rotation detection signal from the pulse encoder and generating a pulse signal, and wherein the first moving position determining means determines the moving position on the basis of the pulse signal from the pulse signal generating circuit.

4. The machine tool as claimed in claim 1, wherein the first moving position determining means comprises an electronic cam data table in which the moving position of the workpiece moving means or the tool moving means is stored in correspondence with the rotational angle position of the workpiece.

* * * * *